United States Patent
Gonzalez Dominguez et al.

(10) Patent No.: US 9,882,800 B2
(45) Date of Patent: Jan. 30, 2018

(54) COMPUTER ROOM ENVIRONMENT SERVICING

(71) Applicant: INTERNATIONAL BUSINESS MACHINES CORPORATION, Armonk, NY (US)

(72) Inventors: Jesus A. Gonzalez Dominguez, Zapopan (MX); Shaun E. Harrington, Sahuarita, AZ (US); Emmanuel Barajas Gonzalez, Guadalajara (MX); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 14/600,259

(22) Filed: Jan. 20, 2015

(65) Prior Publication Data
US 2016/0212224 A1 Jul. 21, 2016

(51) Int. Cl.
*H04L 12/26* (2006.01)
*H04L 12/24* (2006.01)

(52) U.S. Cl.
CPC .......... *H04L 43/50* (2013.01); *H04L 41/5054* (2013.01); *H04L 43/0811* (2013.01)

(58) Field of Classification Search
CPC ..... H04L 41/00; H04L 43/50; H04L 41/5054; H04L 43/0811; G01C 21/206; G06T 19/006; G06T 2215/16; G09B 19/0053; G06F 21/88; G08B 13/2417; G08B 13/2462; H04Q 9/00; H04Q 2209/10; H04Q 2209/47; H04Q 2209/823
See application file for complete search history.

(56) References Cited

U.S. PATENT DOCUMENTS

| 8,024,423 B2 | 9/2011 | Donahue et al. |
| 2009/0243800 A1* | 10/2009 | Haustein ............ G06F 21/88 340/10.1 |
| 2010/0228843 A1 | 9/2010 | Ok et al. |

(Continued)

FOREIGN PATENT DOCUMENTS

EP 001076462 A2 2/2001

OTHER PUBLICATIONS

Mandavi et al., "Wireless Sensor Network for Improving the Energy Efficiency of Data Centers", Mar. 2012, Lawrence Berkeley National Laboratory, 40 pages total.*

(Continued)

*Primary Examiner* — Vivek Srivastava
*Assistant Examiner* — Todd L Barker
(74) *Attorney, Agent, or Firm* — Matthew C. Zehrer (57) ABSTRACT

A computer room management device communicates with a serviceable device via a computer room serviceability network (CRSN) that is distinct from other functional data networks utilized to accomplish computing tasks. The CRSN may be, for example, a Bluetooth connection that provides for the communication of serviceability instructions between devices within the computer room. The management device instructs the serviceable device to activate a location identifier proximately located to a service location. The management device provides a service interface that includes a representation of the activated location identifier along with instructions for providing service at the service location.

3 Claims, 6 Drawing Sheets (56) References Cited

U.S. PATENT DOCUMENTS

| | | | |
|---|---|---|---|
| 2011/0084839 A1* | 4/2011 | Groth | G06Q 10/087 340/572.1 |
| 2012/0047536 A1 | 2/2012 | Janik et al. | |
| 2012/0166958 A1 | 6/2012 | Cramer et al. | |
| 2012/0206418 A1 | 8/2012 | Bi et al. | |
| 2012/0209988 A1* | 8/2012 | Pagan | H04L 41/12 709/224 |
| 2012/0249588 A1* | 10/2012 | Tison | G06F 1/1696 345/633 |
| 2012/0331057 A1 | 12/2012 | Rothschild | |
| 2015/0236921 A1* | 8/2015 | Doorhy | H04L 41/16 709/224 |
| 2016/0080897 A1* | 3/2016 | Moore | H04W 4/02 340/539.13 |
| 2016/0140868 A1* | 5/2016 | Lovett | G09B 19/0053 434/118 |

OTHER PUBLICATIONS

Chavira et al., "Services through NFC technology in AmI Environment", 2008 ACM.

Henning Schulzrinne et al., "Ubiquitous Computing in Home Networks", 2003 IEEE.

* cited by examiner

FIG. 7

COMPUTER ROOM ENVIRONMENT SERVICING

FIELD OF THE INVENTION

Embodiments of the invention generally relate to computer systems and the management or servicing of computer systems within a computer room environment.

DESCRIPTION OF THE RELATED ART

Continual improvements of modern day computers, such as mobile phones, tablets, personal computers, and servers, and devices used in conjunction therewith, have vastly increased the computer's connection and functional topology. For example, where one server used to have one, maybe two, functions modern servers now often have upwards of a dozen functions. Further, it is not uncommon for past computers to include a single Ethernet port and modern computers to include five such ports. Likewise, a computer may now include an adapter card with multiple fibre channel adaptors.

Clustering device interconnections has introduced a new level of complexity because now a single device could be connected to a particular computer or multiple devices may be connected to the computer depending upon a desired implementation.

The culmination such computer environments and interconnection schemes has increased the complexity of implementing modern day computer room, such as a data center. A previous solution has been to utilize instruction manuals to instruct administrators how to setup, interconnect, run, and manage computer room devices. However, with the increasing complexity of computers, the manual describing the computer has also increased in complexity. The computer room setup process alone is presently daunting, often requiring hundreds of pages of descriptive manual text. The need for possible debugging post setup adds yet another level of complexity.

SUMMARY

In an embodiment of the present invention, a process for providing computer room service instructions includes directing, from a management device via a computer room service network (CRSN), a serviceable device to activate a location identifier, providing upon the management device a service user interface including a representation of the activated location identifier and service instructions associated with the activated location identifier, and directing, with the management device via the CRSN, the serviceable device to test completed service associated with the activated location identifier.

In another embodiment of the present invention, a computer program product for providing computer room service instructions includes a computer readable storage medium having program instructions embodied therewith, the program instructions readable by a management device to cause the management device to direct, via the CRSN, the serviceable device to activate the location identifier, provide the service user interface and service instructions associated with the activated location identifier, and direct, via the CRSN, the serviceable device to test completed service associated with the activated location identifier.

In yet another embodiment of the present invention, a computer room service environment includes a serviceable device connected to a management device by the CRSN. The serviceable device includes a location identifier in proximate location with a service location upon which service is to be performed and activates the location identifier upon the receipt of an activation instruction sent from the management device via the CRSN. The management device includes a user interface including a representation of the activated location identifier and service instructions associated with the activated location identifier.

These and other embodiments, features, aspects, and advantages will become better understood with reference to the following description, appended claims, and accompanying drawings.

DETAILED DESCRIPTION

Embodiments of the invention generally relate to computer systems and the management of computer systems within a computer room environment. A computer room management device communicates with one or more serviceable devices via a computer room serviceability network (CRSN) that is distinct from other functional data networks utilized to accomplish computing tasks. The CRSN may be a Bluetooth network or other similar network to provide for the communication of serviceability instructions between devices within a computer room. The management device recognizes the serviceable devices utilizing discovery processes or may be pre-instructed as to which particular devices needing servicing are included in the computer room environment. The management device instructs a serviceable device to activate a location identifier via the CRSN that is proximately located to a service location. The management device includes a service interface that includes a representation of the activated location identifier and service instructions associated with the service location. For example, the service interface may provide instructions to connect one or more components to a particular serviceable device and/or may provide instructions to connect multiple serviceable devices together. Utilizing such embodiments, a computer room administrator may be guided though a setup procedure to correctly configure and deploy one or more computer room devices.

Figure 1:
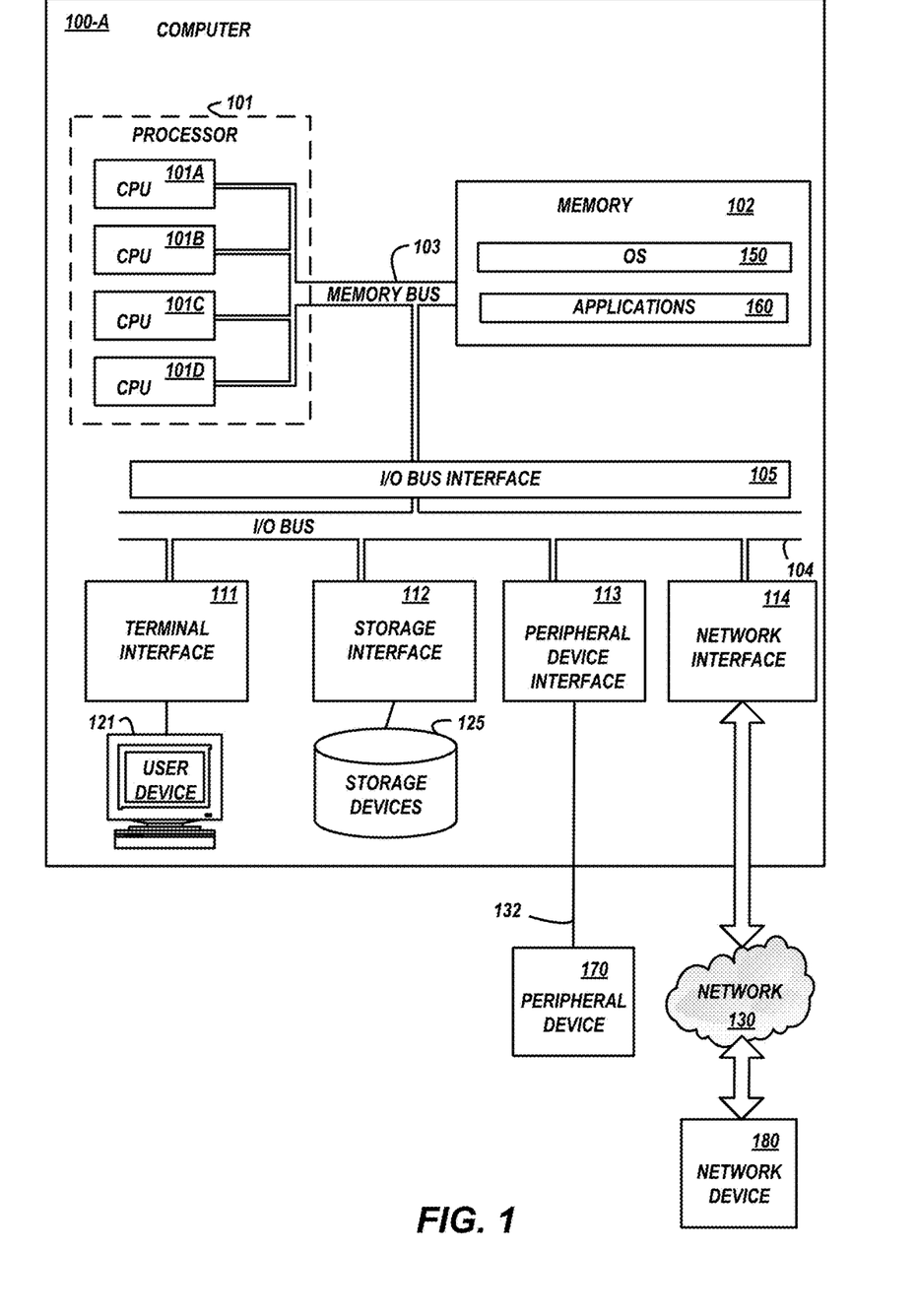
FIG. 1 illustrates a high-level block diagram of an exemplary computer system for implementing various embodiments of the invention.

Referring to the FIGs., wherein like numbers denote like parts throughout the several views, FIG. 1 depicts a high-level block diagram representation of a computer 100-A. Computer 100-A may be connected to a network device 180 via a network 130, connected to a peripheral device 170 via a peripheral interconnect such as a cable, wireless, or other peripheral interconnection, and/or connected to various local components as are described herein via connectors, etc. The term "computer" is used herein for convenience only, and in various embodiments is a more general data handling system, such as a mobile phone, tablet, server computer, storage system, etc. The mechanisms and apparatus of embodiments of the present invention apply equally to any appropriate data handling system.

The major components of the computer 100-A may comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer 100-A contains one or more general-purpose programmable central processing units (CPUs) 101A, 101B, 101C, and 101D, herein generically referred to as the processor 101. In an embodiment, the computer 100-A contains multiple processors typical of a relatively large system; however, in another embodiment the computer 100-A may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100-A, and may also include the virtual memory of other computer systems coupled to the computer 100-A or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, an application 160, etc. are illustrated as being contained within the memory 102 in the computer 100-A, in other embodiments some or all of them may be on different computer systems and may be accessed remotely, e.g., via the network 130. The computer 100-A may use virtual addressing mechanisms that allow the programs of the computer 100-A to behave as if they only have access to a large, single storage entity instead of access to multiple, smaller storage entities. Thus, while operating system 150, application 160, or other program instructions are illustrated as being contained within the main memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, an application 160, and/or other program instructions comprise instructions or statements that execute on the processor 101 or instructions or statements that are interpreted by instructions or statements that execute on the processor 101, to carry out the functions as further described below with reference to FIGs. When such program instructions are able to be run by the processor 101, such computer becomes a particular machine configured to carry out such instructions. For example, an application 160 may provide serviceability instructions upon an user interface to instruct a computer room administrator how to correct connect computer room devices.

In some embodiments, one or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image may be displayed to a user. The processor 101 and GPU may be discrete components or may be integrated into a single component.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100-A, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.).

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device such as solid state drives (SSDs) or optical disk drives. The contents of the main memory 102, or any portion thereof, may be stored to and retrieved from the secondary storage devices 125, as needed. The local secondary storage devices 125 have a slower access time than does the memory 102, meaning that the time needed to read and/or write data from/to the memory 102 is less than the time needed to read and/or write data from/to for the local secondary storage devices 125.

The peripheral device interface 113 provides an interface to any of various other input/output devices. The network adapter 114 provides one or more communications paths from the computer 100-A to other data handling devices such as, I/O devices, other computers, etc.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100-A may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

Network interface 114 may contain electronic components and logic to adapt or convert data of one protocol on I/O bus 104 to another protocol on another bus. Therefore, network interface 114 may connect a wide variety of devices to computer 100-A and to each other such as, but not limited to, tape drives, a SAN network (e.g. switches, storage systems, etc.), optical drives, printers, disk controllers, other bus adapters, PCI adapters, workstations using one or more protocols including, but not limited to, Token Ring, Gigabit Ethernet (GbEN), Ethernet, Fibre Channel, Fibre Channel over Ethernet (FCoE), SSA, Fiber Channel Arbitrated Loop (FCAL), Serial SCSI, Ultra3 SCSI, iSCSI, Infiniband, FDDI, ATM, 1394, ESCON, wireless relays, Twinax, LAN connections, WAN connections, high performance graphics, etc. In embodiments, network 130 is a SAN or other storage network.

Though shown as distinct entities, the multiple I/O interface units 111, 112, 113, and 114 or the functionality of the I/O interface units 111, 112, 113, and 114 may be integrated into a similar device.

In various embodiments, the computer 100-A is a multi-user mainframe computer system, a single-user system, a server computer, storage system, or similar device that has little or no direct user interface, but receives requests from other computer systems (clients). In other embodiments, the computer 100-A is implemented as a desktop computer, portable computer, laptop or notebook computer, tablet computer, pocket computer, telephone, smart phone, pager, automobile, teleconferencing system, appliance, or any other appropriate type of electronic device.

In embodiments, network 130 may be one or more suitable networks or combination of networks and may support any appropriate protocol suitable for communication of data and/or code to/from the computer 100-A and at least the computer 100-B. For example, network 130 may include a communication network (e.g., internet) and network 130 may include a storage network (e.g., SAN). In various embodiments, the network 130 may represent a data handling device or a combination of data handling devices, either connected directly or indirectly to the computer 100-A. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100-A. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc. Network device 180 and/or peripheral device 170 may include similar, less, or additional components as compared with computer 100-A.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. It should be appreciated that the present invention can be implemented with a wide range of memory storage mediums, including for example non-volatile random access memory (NVRAM) technologies such as NAND flash memory, NOR flash memory, phase-change memory (PCM or PRAM), magnetoresistive RAM (MRAM) and resistive RAM (RRAM) as well as combinations thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
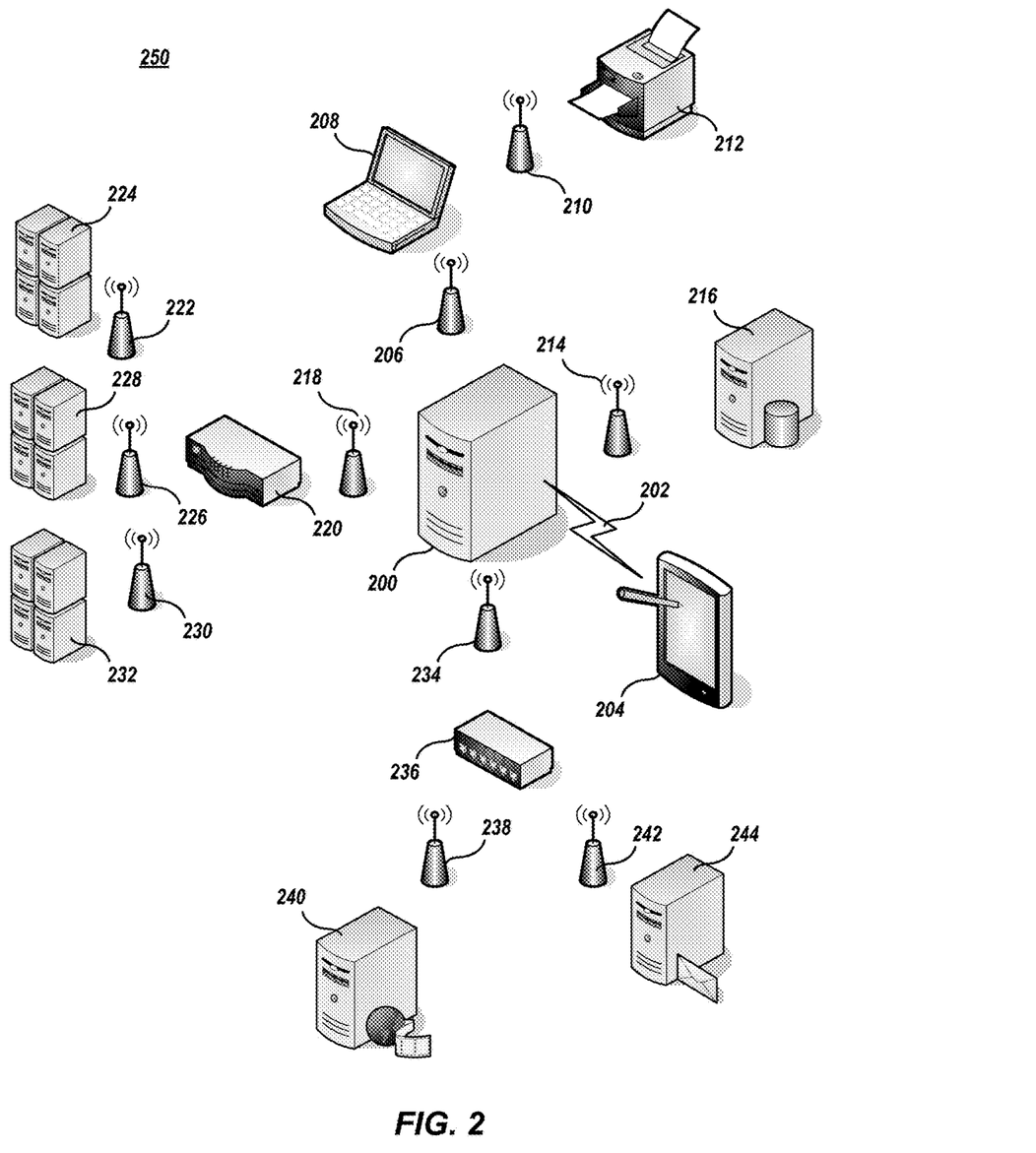
FIG. 2 illustrates an exemplary computer room environment, according to various embodiments of the present invention.

FIG. 2 illustrates an exemplary computer room environment 250, such as a data center, etc. Environment 250 includes serviceable devices 200, 208, 212, 216, 220, 224, 228, 232, 236, 240, and/or 244. Serviceable devices generally are devices within environment 250 that need servicing, such as needing one or more components to be installed, needing application updates, needing repair, etc. For example, environment 250 may be a new data center including multiple serviceable devices to be deployed so that the datacenter may become operational. Environment 250 also includes a management device 204. Each device 200, 204, 208, 212, 216, 220, 224, 228, 232, 236, 240, and 244 may include similar components as computer 100-A.

In certain embodiments, serviceable device 200 may not include a user interface (e.g., serviceable device 200 is a server, etc.). In such embodiments, serviceable device 200 may be communicatively connected to a client management device 204 via a communication link 202 (e.g., CRSN, cable 132, network 130, etc.). In other embodiments, management device 204 and serviceable device 200 may be a single integrated device.

A device within environment 250 generally is to be functionally interconnected with one or more other devices via e.g., a peripheral cable 132, network 130 cable, etc. to provide for sufficient data transfer to accomplish computing functions as is directed by one or more applications 160. Various functional interconnection hierarchies may exist in a particular environment 250 implementation. For example, a particular implementation may require that device 200 be functionally interconnected to device 208, device 216, device 220, and device 236. Such implementation may further require that device 208 be functionally interconnected with device 212. Further, the implementation may require that device 220 be functionally interconnected to device 224, device 228, and device 232. Even further, the implementation may require that device 236 be functionally interconnected to device 240 and device 244.

To provide the environment 250 administrator serviceability instructions for service to be performed one or more of the serviceable devices 200, 208, 212, 216, 220, 224, 228, 232, 236, 240, and/or 244, management device 204 provides a serviceability application and associated serviceability interface. For example, the serviceability interface may provide functional interconnection instructions to properly functionally interconnect the various serviceable devices.

In particular embodiments, the management device 204 identifies a first functional port upon a first serviceable device to which to make the functional interconnection and identifies a second functional port upon a second serviceable device to which to make the functional interconnection such that the first serviceable device and the second serviceable device may transfer data to accomplish computing functions. In another embodiment, the management device 204 identifies a component connector upon a first serviceable device to which to install, uninstall, etc. a component from the first serviceable device.

The serviceability application transmits or receives serviceability data from one or more of the serviceable devices 200, 208, 212, 216, 220, 224, 228, 232, 236, 240, and/or 244 via the CRSN. The communication of serviceability data allows the environment 250 and the serviceability interface to be duplicative. For instance, the management device 204 may identify the first functional port by representing the first serviceable device and simulating a blinking light near the representation of the first port upon the serviceability interface. The management device may further instruct the first serviceable device via the CRSN to physically blink the light near the actual first port.

The CRSN includes multiple individual service connections between serviceability devices. Various service connection hierarchies may exist in a particular environment 250 implementation. For example, in a particular implementation, device 200 is connected to device 208, device 216, device 220, and device 236 via CRSN service connections 206, 214, 218, and 234, respectively. In such implementation, device 208 may be connected to device 212 via CRSN service connection 210. Further, in the implementation, device 220 is connected to device 224, device 228, and device 232 via CRSN service connection 222, 226, and 230 respectively. Even further in the implementation may, device 236 is connected to device 240 and device 244 via CRSN service connection 238 and 242, respectively.

Generally, CRSN connections are wireless connections between serviceability devices that span the length of a computer room and may be provided by a Bluetooth connection, near field connection, or other similar such connection. For clarity, as opposed to functional interconnections between serviceability devices that provide for such devices to accomplish functional tasks, CRSN connections between serviceability devices provide for service data to be transmitted and/or received there between for utilization by the serviceability application by manager 204. For example, device 200 (e.g. a server, etc.) may be functionally interconnected with device 216 (e.g., a storage system) by a storage area network during normal operation to accomplish functional tasks such as data retrieval. However, prior to device 200 and 216 deployment, device 200 may be connected to device 216 by CRSN service connection 214 to provide for service data to be passed between and shared with manager 204 for the display of the serviceability interface that assists the environment 250 administrator in the correct installation of e.g., fibre channel cabling to interconnect device 200 and device 216.

Initially, the management device 204 may proceed with discovery processes to identify or otherwise determine the serviceable devices within environment 250. In other embodiments, the management device 204 is pre-programmed with the identity of each serviceable device within the environment 250. In an exemplary discovery process, each serviceable device may pair with one other serviceable device and/or with the management device 204. The pairing process may be triggered either by a specific request from the administrator to discover the serviceable devices within environment 250, or it may be triggered automatically when powering on each serviceable device, respectively.

The management device 204 may proceed with determining an applicable service application and/or service interface based upon the identification of the serviceable devices. For example, the management device 204 may determine an applicable service application and/or service interface that provides instructions how to interconnect a server with a storage system utilizing a fibre channel cable. In another example, the management device 204 may determine an applicable service application and/or service interface that provides instructions how to install a power supply or other field replaceable unit to a particular serviceable device.

Along with service instructions, the service interface may further simulate a physical identifier such as a blinking light emitting diode (LED), etc. of an associated serviceable device or associated with a component of the serviceable device. For example, the management device 204 may simulate a blinking LED near a port upon the service interface. The management device 204 may also instruct the applicable serviceable device to activate the physical identifier of the associated serviceable device or associated with a component of the serviceable device. For example, management device 204 may instruct serviceable device 208 to flash the LED near an associated port. In this manner, the administrator may be provided with simulated service actions upon the service interface that correlate with actual or otherwise physical service action upon an associated serviceable device. This duplicative provision of service actions increases the probability of correct and efficient environment 250 deployment, servicing, etc. Management device 204 may also determine if completed tasks by the administrator were completed satisfactorily. For example, the management device 204 may instruct one or more serviceable devices via applicable CRSN connections to test a previously implemented service task. For example, the device 204 may instruct device 216 via CRSN 214 to test functional communication ability between different field replaceable units previously installed by the administrator. If the test proves functional communication is available, the device 216 may transmit such information back to device 204 via CRSN 214. In another example, the device 204 may instruct device 236 via CRSN 234 to test functional communication ability between device 236 and device 240 via a cable previously installed. If the test proves functional communication is available, the device 236 may transmit such information back to device 204 via CRSN 234. The management device 204, in turn, may provide applicable confirmation or failure information upon the service interface. In further embodiments, when the environment 250 has been operational, the service application may also provide service interfaces for the administrator to repair a previously functional e.g., field replaceable unit install and/or connector install.

Figure 3:
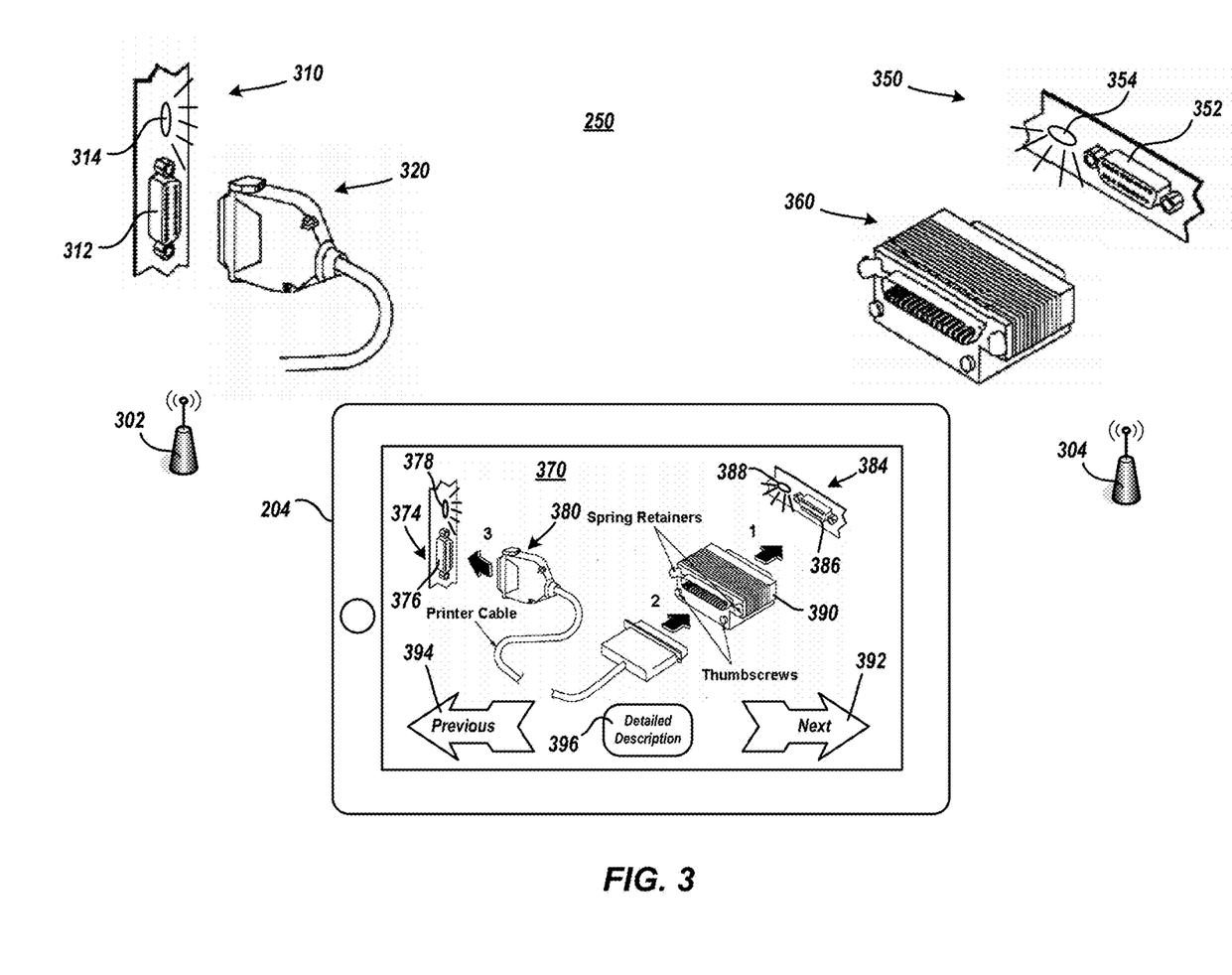
FIG. 3 illustrates a management device for implementing computer room components, according to various embodiments of the present invention.

FIG. 3 illustrates management device 204 for servicing or managing computer room environment 250. In the exemplary implementation of FIG. 3, environment 250 includes serviceable device 310, serviceable device 350, and management device 204. Serviceable device 310 and serviceable device 350 may include similar components as computer 100-A.

Serviceable device 310 and serviceable device 350 are to be functionally interconnected with a physical cable including connector 320 and connector 360. Connector 320 is to be interconnected with connector 312 of serviceable device 310 and connector 360 is to be interconnected with connector 352 of serviceable device 350. The cable is installed to provide for sufficient data transfer to accomplish computing functions utilizing serviceable device 310 and serviceable device 350 during normal operation. Serviceable device 310 further includes a location identifier 314, such as a LED, speaker, or other sensory device. Similarly, serviceable device 350 further includes a location identifier 354, such as a LED, speaker, or other sensory device. The location identifiers 314, 354 are typically associated with and proximately located to a particular connector 312, 352, respectively.

To provide administrator serviceability instructions for service to be performed one or more of the serviceable devices 310, 350, management device 204 provides a serviceability application and associated serviceability interface 370. Serviceability interface 370 provides physical cable interconnection instructions or guidance to properly functionally interconnect serviceable devices 310 and 350 to provide for sufficient data transfer to accomplish computing functions during normal operation.

Interface 370 includes a serviceable device 310 representation 374, a serviceable device 350 representation, and a physical cable representation that includes connector 320 representation 380 and connector 360 representation 390. Interface 370 further includes connector 312 representation 376 and includes connector 352 representation 386. Similarly, interface 370 further includes location identifier 314 representation 378 and identifier 354 representation 388. The various interface 370 representations are visual representations of the associated physical device or component within environment 250. In various embodiments, interface 370 further includes navigation objects 394, 396, and 392 for the engagement and resultant navigation of the interface 370. For example, the administrator may make a touch gesture upon object 392 to indicate that the installation of the physical cable between serviceable devices 310 and 350 was completed. Further, the administrator may move a cursor to object 396 and make a click engagement upon object 396 to obtain more detailed instructions for to correctly service devices 310 and 350. The interface 370 also includes service instructions as is exemplarily indicated by numerals 1, 2, and 3 to correctly service serviceable devices 310, 350. The service instructions provided upon interface 370 may be dynamic (e.g., connector 360 representation 390 may be shown being moved to and installed with connector 352 representation 386, etc.).

In embodiments, the management device 204 identifies connector 312 of serviceable device 310 to which to make the functional interconnection by instructing (via CRSN service connection 302) serviceable device 310 to activate location identifier 314. Simultaneous to the activation of location identifier 314, interface 370 provides a simulated activation of location identifier 314 representation 378. Thus, a representation of the activation of location identifier 314 is being provided upon interface 370 simultaneous to the actual activation of location identifier 314 to assist the administrator in correctly providing service. Similarly, the management device 204 identifies connector 352 of serviceable device 350 to which to make the functional interconnection by instructing (via CRSN service connection 304) serviceable device 350 to activate location identifier 354. Simultaneous to the activation of location identifier 354, interface 370 provides a simulated activation of location identifier 354 representation 386.

The serviceability application that provides interface 370 transmits and/or receives serviceability data from one or more of the serviceable devices 310 and 350 via the CRSN (e.g., the identities of serviceable devices within environment 250, instructions to respective service devices to active location identifiers, etc.). The communication of serviceability data allows the environment 250 and the serviceability interface 370 to provide for the duplicative activation of e.g., location identifier 314 and location identifier 314 representation 378. In the exemplary environment 250 of FIG. 3, management device 204 is connected to device 310 by CRSN service connection 302 and is connected to device 350 by CRSN service connection 304.

Figure 4:
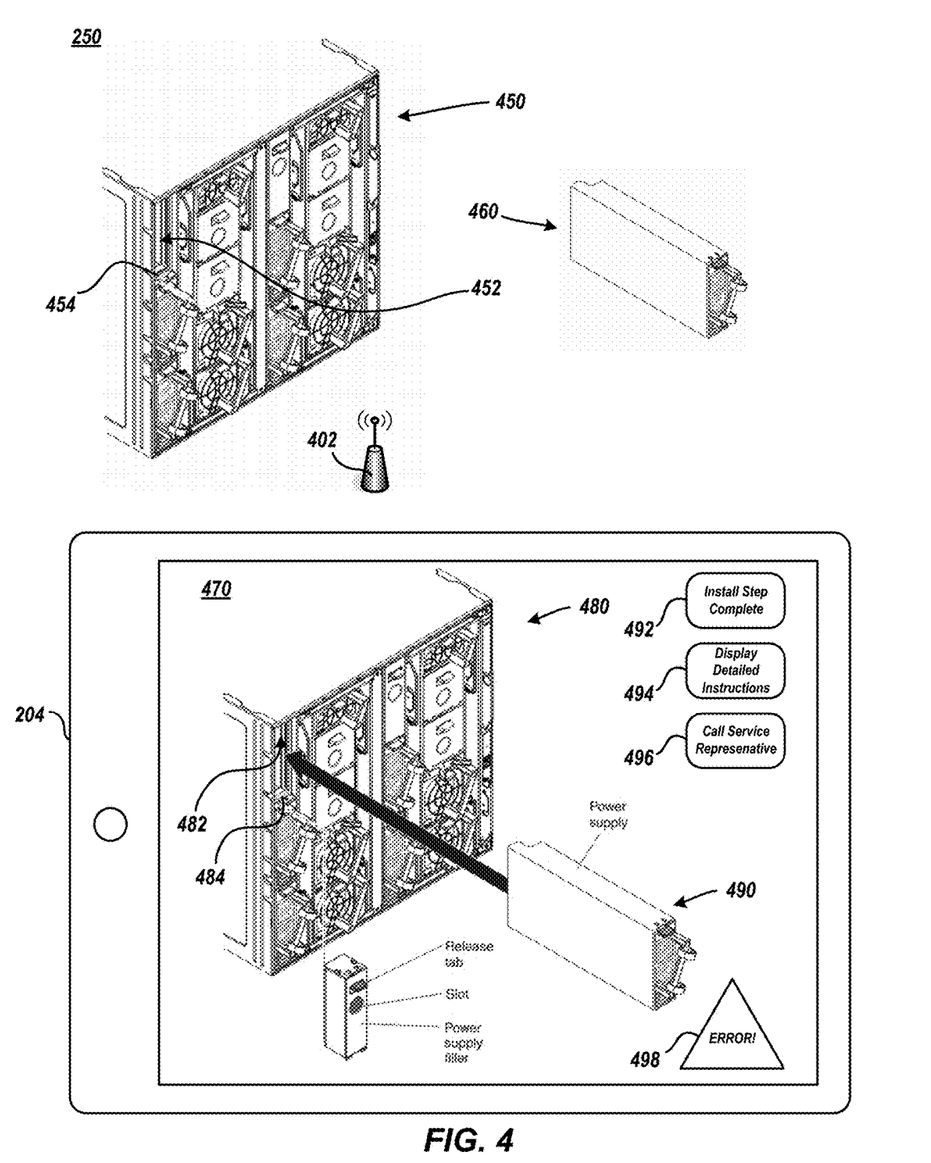
FIG. 4 illustrates a management device for implementing computer room components, according to various embodiments of the present invention.

FIG. 4 illustrates management device 204 for servicing or managing computer room environment 250. In the exemplary implementation of FIG. 4, environment 250 includes serviceable device 450, serviceable device component 460, and management device 204. Serviceable device 450 may include similar components as computer 100-A.

Serviceable device 450 and component 460 are to be functionally interconnected by engaging, interconnecting, installing, etc. component 460 with serviceable device. In certain embodiments, component 460 is a field replaceable unit, such as a power supply, fan assembly, etc. For example, component 460 may be inserted into slot 452 of device 450 whereby a connector upon the component 460 is interconnected with a connector within slot 452. The component 460 is installed to provide for sufficient data handling to accomplish computing functions during normal operation. Serviceable device 450 further includes a location identifier 454, such as a LED, speaker, or other sensory device. The location identifier 454 may be associated with and proximately located to a particular engagement feature of device 450, such as slot 452, an associated connector, etc.

To provide administrator serviceability instructions for service to be performed upon serviceable device 450, management device 204 provides a serviceability application and associated serviceability interface 470. Serviceability interface 470 provides component 460 installation instructions or guidance to properly functionally interconnect component 460 with device 450 to provide for sufficient data handling to accomplish computing functions during normal operation.

Interface 470 includes a serviceable device 450 representation 480 and a serviceable device component 4600 representation 490. Similarly, interface 470 further includes location identifier 454 representation 484 and a slot 452 representation 482. The various interface 470 representations are visual representations of the associated physical device or component within environment 250. In various embodiments, interface 470 further includes objects 492, 494, 496, and 498 to provide for the engagement and user interaction with interface 470. For example, the administrator may make a touch gesture upon object 492 to indicate that the installation of the component 460 to device 450 was completed. Further, the administrator may move a cursor to object 496 and make a click engagement upon object 496 to contact a service representative to obtain further service assistance. Further, an error object 498 may be provided to notify that the interconnection of component 460 with device 450 has failed. Success or failure data that indicates the interconnection of component 460 with device 450 was successful or failed, respectively, may be provided by device 450 to device 204 via CRSN service connection 402. The interface 470 also includes service instructions as is exemplarily indicated arrows, instruction indications, etc. The service instructions provided upon interface 470 may be dynamic (e.g., component 460 representation 490 may be shown being moved to and installed with device 460 representation 480, etc.).

In embodiments, the management device 204 identifies slot 452 by instructing (via CRSN service connection 402) serviceable device 450 to activate location identifier 454. Simultaneous to the activation of location identifier 452, interface 470 provides a simulated activation of location identifier 454 representation 484. Thus, a representation of the activation of location identifier 454 is being provided upon interface 470 simultaneous to the actual activation of location identifier 454 to assist the administrator in correctly providing service.

The serviceability application that provides interface 470 transmits and/or receives serviceability data from one or more of the serviceable device 450 and/or component 460 via the CRSN (e.g., the identities of serviceable devices within environment 250, instructions to respective service devices to active location identifiers, success of failure of service performed, etc.). The communication of serviceability data allows the environment 250 and the serviceability interface 470 to provide for the duplicative activation of e.g., location identifier 454 and location identifier 454 representation 484. In the exemplary environment 250 of FIG. 4, management device 204 is at least connected to device 450 by CRSN service connection 402.

In various embodiments, to achieve sufficient service data transmission between one or more serviceable devices and/or serviceable device components and management device 204, the management device 204 includes a service application which includes one or more service templates associated with various service scenarios, the management device 204 and the one or more serviceable devices and/or serviceable device components are interconnected by CRSN, and each management device 204 and the one or more serviceable devices and/or serviceable device components include a CRSN application interface to receive or transmit service data.

In a computer room deployment implementation, after powering on each applicable device within environment 250, the administrator via management device 204 calls the service application to begin the deployment process. The application may include only those preloaded templates by associated with each applicable serviceable device and/or serviceable device component within the particular environment 250 implementation. Alternatively, the application may include numerous templates and the application may determine applicable templates associated with identified serviceable devices and/or serviceable device components within the particular environment 250 (via discovery processes, pairing, etc.). Those applicable templates may be provided to the administrator via a service interface upon management device 204.

In embodiments, the interface may provide all of the serviceable devices that it is aware of within environment 250. The interface may request the administrator couple various devices. For example, if the administrator wants to connect a server with a storage system, the administrator may couple representations of the server and storage system upon the interface. This coupling allows for service data, signals, and/or instructions to be sent across the CRSN to each applicable device or component.

The service application may further implement health/RAS processes to verify applicable serviceable devices and/or components are in an expected state (e.g., powered on, disconnected, awaiting connection, awaiting deployment, etc.). Similarly, subsequent to normal operation, the application may be utilized to implement health/ RAS processes to determine faulty devices or components, and may provide service or repair guidance.

Upon the service application determining the identity of relevant devices or components within environment 250, the application provides relevant service templates via the interface. For example, the interface may provide guidance upon the installation of cabling between various devices, the component setup of a particular serviceable device, etc. If there is more than one setup configuration available for the device or component devices, the application provides the various options upon the interface e.g., for a particular selection by the administrator, etc. For each service process, the interface provides the image of what devices, components, etc. are applicable, needed, etc. and provides location representation information to locate relevant locations for service to be performed. In certain embodiments, the interface highlights only a single location at a time (e.g. a specific port, etc.).

The service application may verify each service step before proceeding to a subsequent step. For example, if the administrator installs a bad cable between two serviceable devices, the application instructs the applicable devices to test such connection and may provide an error notification upon the interface.

Figure 5:
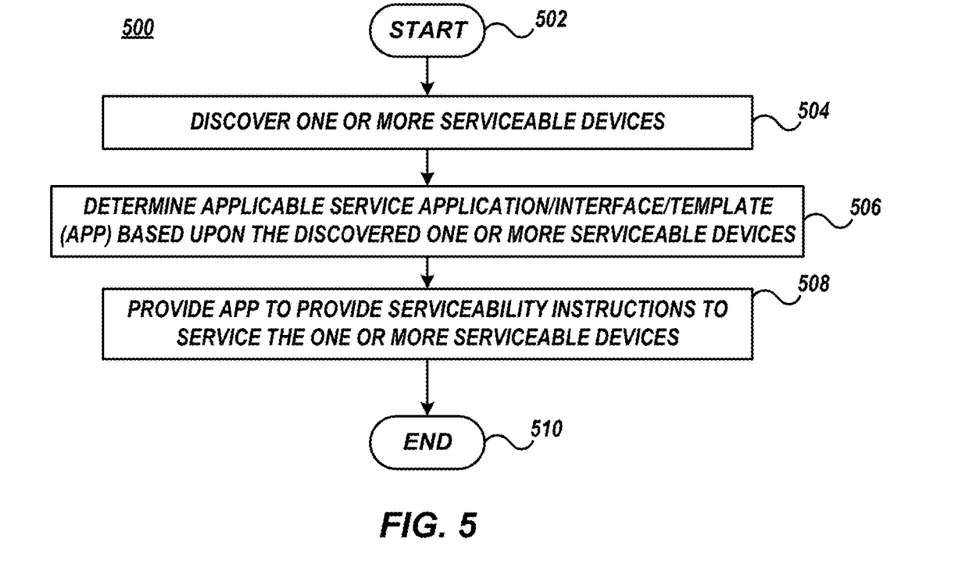
FIG. 5 illustrates an exemplary process to provide computer room service instructions, according to various embodiments of the present invention.

FIG. 5 illustrates an exemplary process 500 to provide computer room serviceability instructions, according to various embodiments of the present invention. Process 500 may be utilized by a designated computer, such as computer 100-A, there becoming management device 204, to provide a service interface thereupon. Process 500 begins at block 502 and continues with management device 204 discovering or otherwise determining one or more serviceable devices or service device components within a computer room environment 250 (block 504). For example, the device 204 may implement discovery, pairing, etc. processes to determine the identity of such serviceable devices. Such discovery processes utilizes CRSN connections between the managment device 204 and those serviceable devices and/or device components. In other implementations, the device 204 may be pre-programmed with instructions that identify the one or more serviceable devices or service device components. For example, the manufacture of servers to be installed in a customer's computer room may include a management device along with the servers and server components. The manufacturer, knowing the identity, quantities, etc. of devices and components sent to the customer may include such information within the service application of management device 204.

Process 500 may continue with the management device 506 determining applicable service application templates associated with the determined identity of the one or more serviceable devices and/or components (block 506). For example, via the service interface, the administrator may couple various serviceable devices. The service application may then provide installation or other servicing information related to the coupled devices. In other example, the application may determine applicable templates from amongst a plurality of templates associated with those devices identified in the preceding determining process.

Process 500 may further continue with the managing device providing applicable templates via the interface in order to provide serviceability instructions to service (i.e. install, repair, etc.) the one or more serviceable devices and/or device components (block 508). For example, the management device may display a graphical interface, such as service interfaces 370, 470 including representations of the one or more serviceable devices and/or components. Process 500 ends at bock 510.

Figure 6:
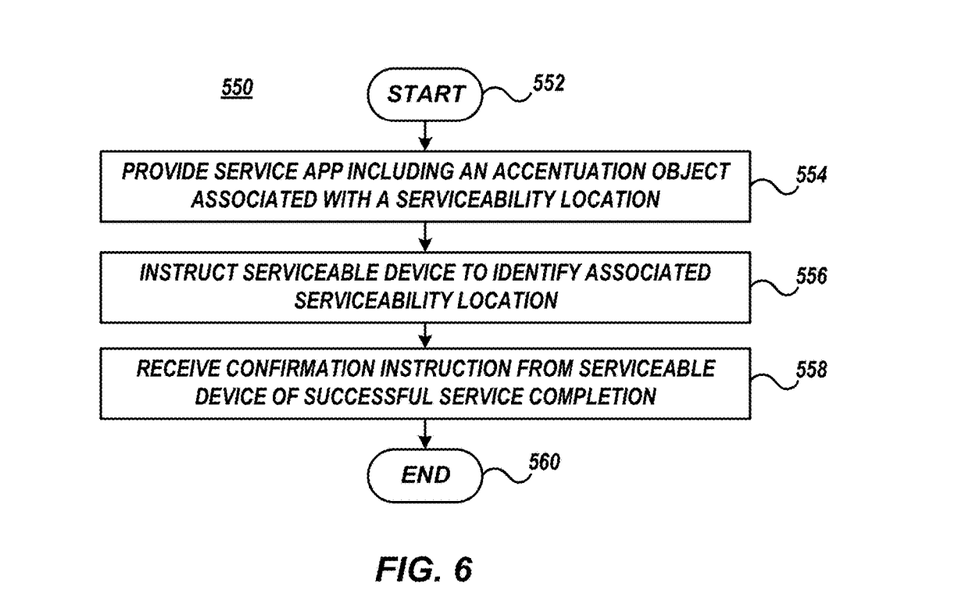
FIG. 6 illustrates an exemplary process for providing computer room service instructions, according to various embodiments of the present invention.

FIG. 6 illustrates an exemplary process 550 to provide computer room serviceability instructions, according to various embodiments of the present invention. Process 550 may be utilized by a designated computer, such as computer 100-A, there becoming management device 204, to provide a service interface thereupon. Process 550 begins at block 552 and continues with the management device 204 providing a service application and associated service interface. The interface includes a representation of a location identifier that is associated with a physical identifier of a service device or component (block 554). For example, an interface 370 displays an activated location identifier representation 388 which represents the actual physical location identifier 354 upon serviceable device 350.

Process 550 may continue with management device 204 instructing the one or more serviceable devices or components via the CRSN to identify or otherwise active the corollary location identifier (block 556). For example, the management device instructs serviceable device 350 via CRSN service connection 304 to activate location identifier 354. After such service guidance, the administrator may complete the service task and indicate as such upon the service interface. In such embodiments, management device may instruct via the CRSN to confirm that the service task was successful. For example, the management device 204 may instruct serviceable devices 310 and 350 to attempt a test communication there between across the cable that was just installed and was associated with the respective location identifiers 314, 354.

Process 550 may continue with the management device 204 receiving from the one or more serviceable devices or components that the previous service task was completed successfully (block 558). For example, the serviceable devices 310 and 350 may notify management device via the CRSN that data is able to be communicated via the cable associated with the respective location identifiers 314, 354 and therefore the installation of the cable to serviceable devices 310 and 350 was successful. In embodiments, if the service task was unsuccessful, the application may provide further service guidance. Process 550 ends at block 560.

Figure 7:
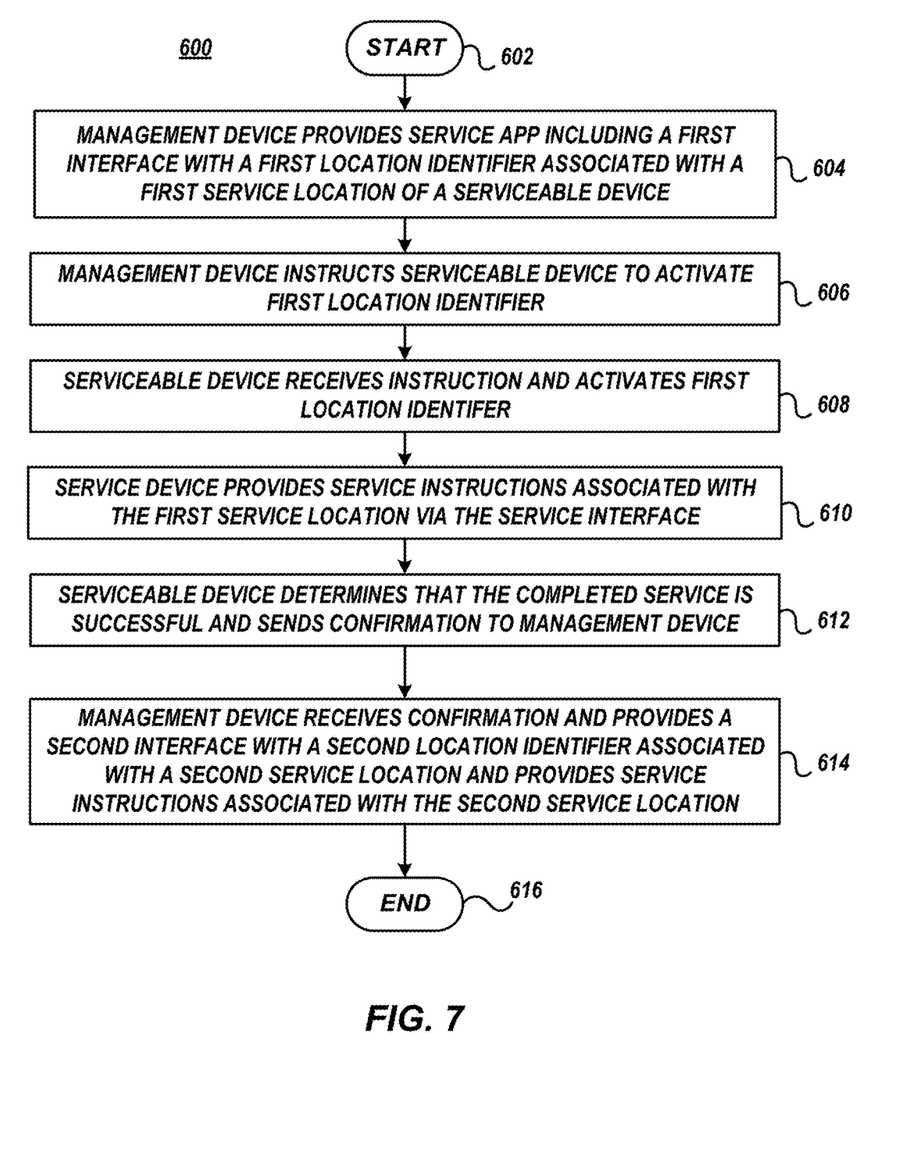
FIG. 7 illustrates an exemplary process for providing computer room service instructions, according to various embodiments of the present invention.

FIG. 7 illustrates an exemplary process 600 to provide computer room serviceability instructions, according to various embodiments of the present invention. Process 600 may be utilized by a computer room environment 250. Process 600 begins at block 602 and continues with the management device 204 providing a service application and associated first service interface including at least a first location identifier representation associated with a first location identifier of a first serviceable device (block 604). For example, management device 204 displays interface 470 including location identifier representation 484 that is associated location identifier 454 of serviceable device 450.

Process 600 may continue with the management device instructing the first serviceable device to identify first location identifier via the CRSN (block 606). For example, management device 204 instructs serviceable device 450 via CRSN service connection 402 to activate location identifier 454. Process 600 may continue with the first serviceable device receiving the instruction via the CRSN from management device 204 and activating the applicable location identifier (block 608).

Process 600 may continue with management device 204 providing service instructions or guidance associated with the first location identifier via the service application (block 610). For example, interface 470 provides guidance upon how to insert component 460 into slot 452 of serviceable device 450 by dynamically inserting representation 490 of component 460 within a representation 482 of slot 452. Instructional text or other object may be provided by the interface to assist in accurate task completion.

Process 600 may further continue with the serviceable device determining if the service task was successfully completed and sends success or failure information, as appropriate, to management device 204 (block 612). For example, upon receiving an instruction from management device 204 via the CRSN, serviceable device 450 may test the connection of the component 460 thereto. If the connection is successful, the device 450 sends a successful confirmation to management device 204 via the CRSN. If the connection is unsuccessful, the device 450 sends a failure or error information to management device 204 via the CRSN.

Process 600 may continue with the management device 204 receiving the success or failure information from the serviceable device and provides further service instruction if it is in receipt of failure or error information and provides a second interface that includes a second representation of a location identifier associated with a physical location identifier and provides service instructions associated with the second location identifier via the interface (block 614). Process 600 ends at block 616.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A process for providing computer room service instructions within a computer room service environment comprising:
    pairing a management device with a plurality of distinct serviceable devices via a computer room service network (CRSN), wherein the paring is triggered by a specific request from the administrator to discover the serviceable devices within the computer room service environment or triggered automatically when powering on serviceable devices, and wherein the CRSN comprises at east one of a Bluetooth connection™ or near field connection;
    discovering one or more serviceable devices located within the computer room service environment:
    determining, by a service application provided by the management device, a service template from a plurality of templates associated with various service scenarios to facilitate the generation of the computer room service instructions; and wherein the service template provides for a service graphical user interface (GUI) which provides for visual representations of serviceable devices, and wherein the service GUI includes at least one of a serviceable device representation, a physical cable representation that includes a connector representation, and a connector representation;

determining, with the management device, that a first serviceable device should be communicatively connected to a second serviceable device with a cable:

directing, from the management device via the CRSN, the first serviceable device to activate a first light of the first serviceable device that is proximately located to a first port of the first serviceable device to which the cable is to be connected and directing, from the management device via the CRSN, the second serviceable device to activate a second light of the second serviceable device that is proximately located to a second port of the second serviceable device to which the cable is to be connected;

providing, upon the management device, the service GUI, comprising a representation of the first service device, a representation of the first port, a representation of the activated first light, a representation of the second service device, a representation of the second port, a representation of the activated second light, service instructions associated with connecting the cable to the first port and to the second port, and a completion object;

receiving, upon the service GUI, a user manipulation of the completion object to indicate that cable was connected to the first port and to the second port:

upon the reception of the user manipulation of the completion object, directing, with the management device via the CRSN, the first serviceable device to test whether the first serviceable device is communicatively connected to the second serviceable device via the cable; and upon the first serviceable device confirming that the first serviceable device is communicatively connected to the second serviceable device via the cable, sending with the first serviceable device, a confirmation to the management device via the CRSN.

2. A computer program product for providing computer room service instructions within a computer room service environment, the computer program product comprising a computer readable storage medium having program instructions embodied therewith:, the program instructions readable by a management device to cause the management device to:

pair with a plurality of distinct serviceable devices via a computer room service network (CRSN), wherein the paring is triggered by a specific request from the administrator to discover the serviceable devices within the computer room service environment or triggered automatically when powering on serviceable devices, and wherein the CRSN comprises at least one of a Bluetooth connection™ or near field connection;

discovering one or more serviceable devices located within the computer room service environment;

determining, by a service application provided by the management device, a service template from a plurality of templates associated with various service scenarios to facilitate the generation of the computer room service instruction; and wherein the service template provides for a service graphical user interface (GUI) which provides for visual representations of serviceable devices, and wherein the service GUI includes at least one of a serviceable device representation, a physical cable representation that includes a connector representation, and a connector representation;

determine that a first serviceable device should be communicatively connected to a second serviceable device with a cable;

direct, via a computer morn service network (CRSN), the serviceable device to activate a first light of the first serviceable device that is proximately located to a first port of the first serviceable device to which the cable is to be connected and directing, from the management device via the CRSN, the second serviceable device to activate a second light of the second serviceable device that is proximately located to a second port of the second serviceable device to which the cable is to be connected;

provide the service GUI comprising a representation of the first service device, a representation of the first port, a representation of the activated first light, a representation of the second service device, a representation of the second port, a representation of the activated second light, service instructions associated with connecting the cable to the first port and to the second port, and a completion object;

receive a user manipulation of the completion object to indicate that cable was connected to the first port and to the second port;

upon the reception of the user manipulation of the completion object, direct, via the CRSN, the first serviceable device to test whether the first serviceable device is communicatively connected to the second serviceable device via the cable; and upon the first serviceable device confirming that the first serviceable device is communicatively connected to the second serviceable device via the cable, receive from the first serviceable device, a confirmation via the CRSN.

3. A computer room service environment comprising:

a plurality of distinct serviceable devices paired to a management device by a computer room service network (CRSN), wherein the paring is triggered by a specific request from the administrator to discover the serviceable devices within the computer room service environment or triggered automatically when powering on serviceable devices, and wherein the CRSN comprises at least one of a Bluetooth™ connection or near field connection;

discovering one or more serviceable devices located within the computer room service environment;

determining, by a service application provided by the management device, a service template from a plurality of templates associated with various service scenarios to facilitate the generation of the computer room service instructions; and wherein the service template provides for a service graphical user interface (GUI) which provides for visual representations of serviceable devices, and wherein the service GUI includes at least one of a serviceable device representation, a physical cable representation that includes a connector representation, and a connector representation;

a first serviceable device comprising a first light in proximate location with a first port of the first serviceable device to which a cable is to be connected, the first serviceable device activates the first light upon the receipt of an activation instruction sent from the management device via the CRSN;
a second serviceable device comprising a second light in proximate location with a second port of the second serviceable device to which the cable is to be connected, the second serviceable device activates the second light upon the receipt of an activation instruction sent from the management device via the CRSN;
the management device determines that the first serviceable device should be communicatively connected to the second serviceable device with the cable, the management device comprising the service GUI providing a representation of the first service device, a representation of the first port, a representation of the activated first light, a representation of the second service device, a representation of the second port, a representation of the activated second light, service instructions associated with connecting the cable to the first port and to the second port, and a completion object, the management device receives upon the service GUI a user manipulation of the completion object to indicate that cable was connected to the first port and to the second port and upon receipt of the user manipulation of the completion object directs via the CRSN, the first serviceable device to test whether the first serviceable device is communicatively connected to the second serviceable device via the cable and upon the first serviceable device confirming that the first serviceable device is communicatively connected to the second serviceable device via the cable, the first serviceable device sends a confirmation to the management device via the GRSN.

* * * * *